(12) United States Patent
Pan et al.

(10) Patent No.: US 10,237,381 B2
(45) Date of Patent: Mar. 19, 2019

(54) TELEPHONE RECEIVER IDENTIFICATION

(71) Applicant: Sorenson IP Holdings, LLC, Salt Lake City, UT (US)

(72) Inventors: Jasper Cheekeong Pan, Draper, UT (US); Brian Chevrier, Highland, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 15/648,637

(22) Filed: Jul. 13, 2017

(65) Prior Publication Data

US 2019/0020746 A1 Jan. 17, 2019

(51) Int. Cl.
*H04M 1/24* (2006.01)
*H04M 1/00* (2006.01)
*H04M 1/03* (2006.01)
*H04R 1/22* (2006.01)
*H04R 3/04* (2006.01)

(52) U.S. Cl.
CPC .............. *H04M 1/03* (2013.01); *H04R 1/225* (2013.01); *H04R 3/04* (2013.01); *H04R 2430/01* (2013.01)

(58) Field of Classification Search
USPC ..... 379/144.01, 399.01, 325, 412.02–413.04
See application file for complete search history.

(56) References Cited

U.S. PATENT DOCUMENTS

| | | | |
|---|---|---|---|
| 5,105,460 A * | 4/1992 | Williams | H04M 17/026 379/155 |
| 5,127,045 A | 6/1992 | Cragun et al. | |
| 5,151,896 A | 9/1992 | Bowman et al. | |
| 5,602,912 A * | 2/1997 | Hershbarger | H04B 1/586 379/345 |
| 5,687,228 A * | 11/1997 | Ellington, Jr. | H04M 1/60 379/390.01 |
| 6,683,949 B1 | 1/2004 | Stelman | |
| 7,103,381 B1 * | 9/2006 | Wright | H04M 1/6083 455/556.1 |

(Continued)

FOREIGN PATENT DOCUMENTS

WO    WO 9501700 A1 *  1/1995  .............. H04M 1/18

OTHER PUBLICATIONS

Ho, Purdy, "A Handset Identifier Using Support Vector Machines", ISCA Archive, 7th International Conference on Spoken Language Processing, Sep. 16-20, 2002, 4 pages.

(Continued)

*Primary Examiner* — Quoc D Tran
(74) *Attorney, Agent, or Firm* — Maschoff Brennan (57) ABSTRACT

A telephone system may include a telephone receiver and a base unit. The telephone receiver may include a first electrical contact and a second electrical contact configured to be electrically grounded. The first electrical contact may be either coupled to the second electrical contact or electrically floating. The base unit may be configured to be coupled to the telephone receiver over a wired connection. The base unit may be configured to electrically ground the second electrical contact by way of the wired connection. The base unit may also be configured to determine an identification of the telephone receiver based on whether the first electrical contact is electrically grounded or electrically floating.

20 Claims, 7 Drawing Sheets

(56) References Cited

U.S. PATENT DOCUMENTS

| | | | |
|---|---|---|---|
| 7,836,216 B2* | 11/2010 | Kashi | H01R 24/58 381/74 |
| 9,319,379 B1 | 4/2016 | Burcham et al. | |
| 2006/0210053 A1* | 9/2006 | Chang | H04L 12/40 379/332 |
| 2009/0163082 A1* | 6/2009 | De Dios Martin | H01R 24/64 439/676 |
| 2014/0103864 A1 | 4/2014 | Song | |
| 2014/0314220 A1* | 10/2014 | Charugundla | G10L 15/26 379/88.14 |
| 2016/0072939 A1 | 3/2016 | Kawamura et al. | |
| 2016/0246747 A1* | 8/2016 | Rand | G06F 13/385 |
| 2017/0054853 A1 | 2/2017 | Rodriguez et al. | |
| 2018/0123293 A1* | 5/2018 | Hogue | H01R 4/2416 |

OTHER PUBLICATIONS

Shaikh et al., "Communication Technologies, Information Security and Sustainable Development", IMTIC'15, 4th International Multi-Topic Conference, Feb. 11-13, 2015, 446 pages.
International Search Report and Written Opinion received in International Patent Application No. PCT/US18/39064, dated Dec. 14, 2018.

* cited by examiner

TELEPHONE RECEIVER IDENTIFICATION

FIELD

The embodiments discussed herein are related to telephone receiver identification.

BACKGROUND

Microphones and speakers may be used in communication systems. For example, a telephone receiver may include a microphone and a speaker. Different microphones and speakers may have different frequency responses. As a result, the same audio output by different speakers may sound different and the audio generated by different microphones for the same received sound may be different.

The subject matter claimed herein is not limited to embodiments that solve any disadvantages or that operate only in environments such as those described above. Rather, this background is only provided to illustrate one example technology area where some embodiments described herein may be practiced.

SUMMARY

A telephone system may include a telephone receiver and a base unit. The telephone receiver may include a first electrical contact and a second electrical contact configured to be electrically grounded. The first electrical contact may be either coupled to the second electrical contact or electrically floating. The base unit may be configured to be coupled to the telephone receiver over a wired connection. The base unit may be configured to electrically ground the second electrical contact by way of the wired connection. The base unit may also be configured to determine an identification of the telephone receiver based on whether the first electrical contact is electrically grounded or electrically floating.

BRIEF DESCRIPTION OF THE DRAWINGS

Example embodiments will be described and explained with additional specificity and detail through the use of the accompanying drawings in which:

FIG. 1b illustrates an example multi-wire cable coupled between electrical connectors of the telephone system of FIG. 1a;

FIG. 1c illustrates an example of a base unit of the telephone system of FIG. 1a;

DESCRIPTION OF EMBODIMENTS

Different microphones and speakers may have different frequency responses. As a result, the same audio output by different speakers may be different and the audio generated by different microphones for the same received sound may be different. Some embodiments described in this disclosure may include a telephone system that is configured to help reduce differences in audio output and generated by different telephone receivers that may be coupled to a base unit of the telephone system.

To help to reduce differences in audio output and generated, the telephone system may be configured to identify a type of telephone receiver coupled to the base unit of the telephone system. After identifying the type of telephone receiver, the base unit may apply audio filters configured for the type of the telephone receiver to audio provided to and received from the telephone receiver. The audio filters may be configured to compensate for a frequency response of the identified telephone receiver. As a result, the telephone system may help to reduce differences in audio output and generated by different telephone receivers that may be coupled to the base unit of the telephone system.

In some embodiments, the base unit may be configured to identify the type of telephone receiver using a passive system that does not send electrical current and/or voltage to or receive electrical current and/or voltage from the telephone receiver. In these and other embodiments, the telephone receiver may include various electrical contacts, which are in an electrical connector coupled to the base unit, that may be used to identify the type of the telephone receiver. The electrical contacts may be either electrically grounded or electrically floating. The base unit may be configured to determine which of the electrical contacts are electrically grounded or electrically floating to identify the type of the telephone receiver.

Figure 1A:
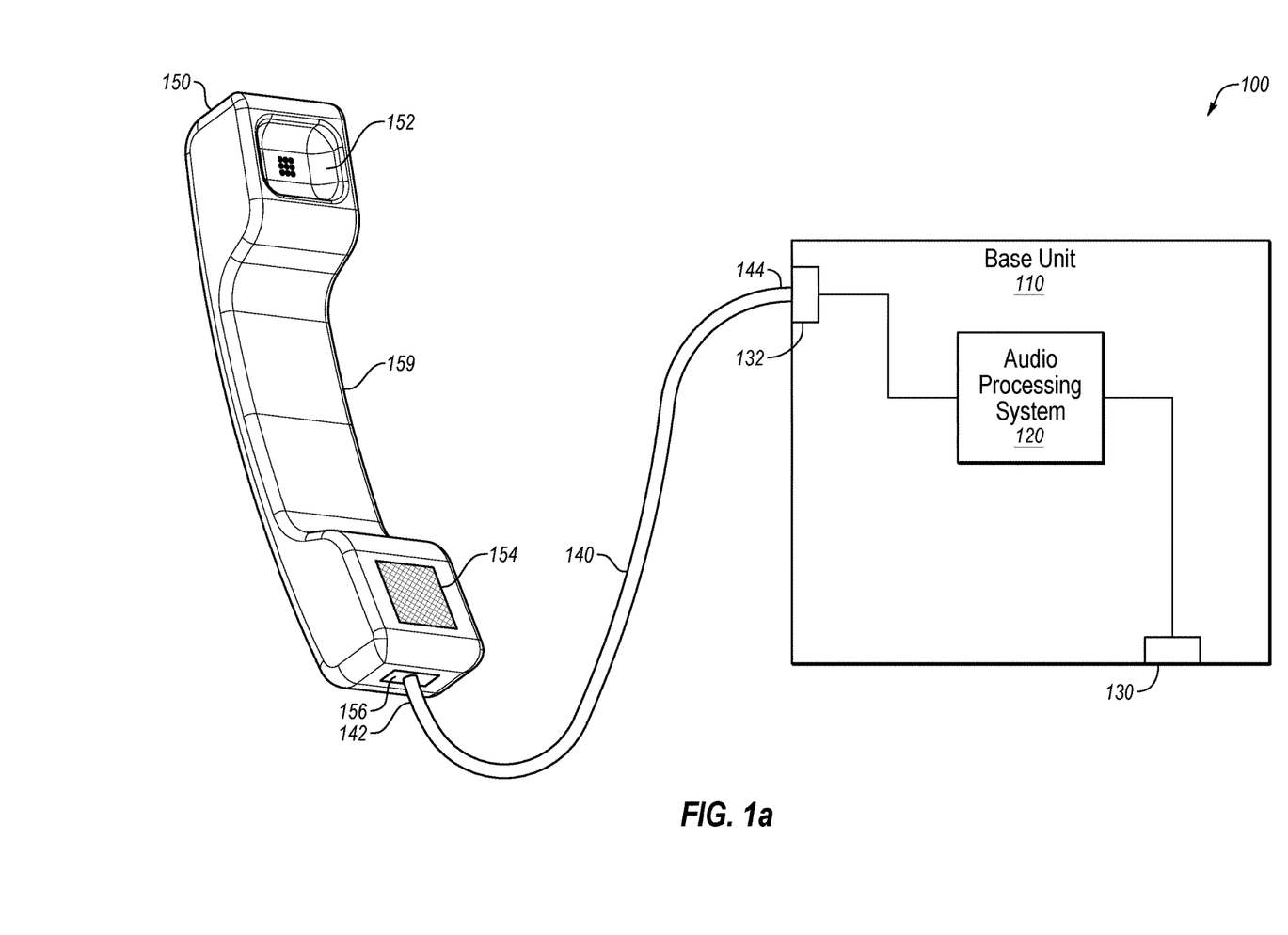
FIG. 1a illustrates an example telephone system.

Turning to the figures, FIG. 1a illustrates an example telephone system 100. The telephone system 100 may be arranged in accordance with at least one embodiment described in the present disclosure. As illustrated, the telephone system 100 includes a base unit 110 and a telephone receiver 150 that are electrically coupled by a multi-line cable 140.

The telephone receiver 150 may be any receiver that may include a speaker 152, a microphone 154, and an electrical connector 156. As illustrated, the telephone receiver 150 includes a body 159 that houses the speaker 152, the microphone 154, and the telephone receiver 150. In some embodiments, the telephone receiver 150 may be configured to receive electrical audio signals from the base unit 110 by way of the electrical connector 156 and convert the electrical audio signals to acoustical audio signals using the speaker 152. Alternatively or additionally, the telephone receiver 150 may be configured to receive acoustical audio signals at the microphone 154 and convert the acoustical audio signals to electrical audio signals using the microphone 154. The electrical audio signals may be provided to the base unit 110 by way of the electrical connector 156.

In this disclosure, the term audio signals may refer to electrical audio signals or acoustical audio signals. When the audio signals are being received by the base unit 110, used by the base unit 110, transmitted between the base unit 110 and the telephone receiver 150, and received by the telephone receiver 150 from the base unit, the audio signals may be electrical audio signals. When the audio signals are output by the speaker 152 or received by the microphone 154, the audio signals may be acoustical audio signals.

Figure 1B:
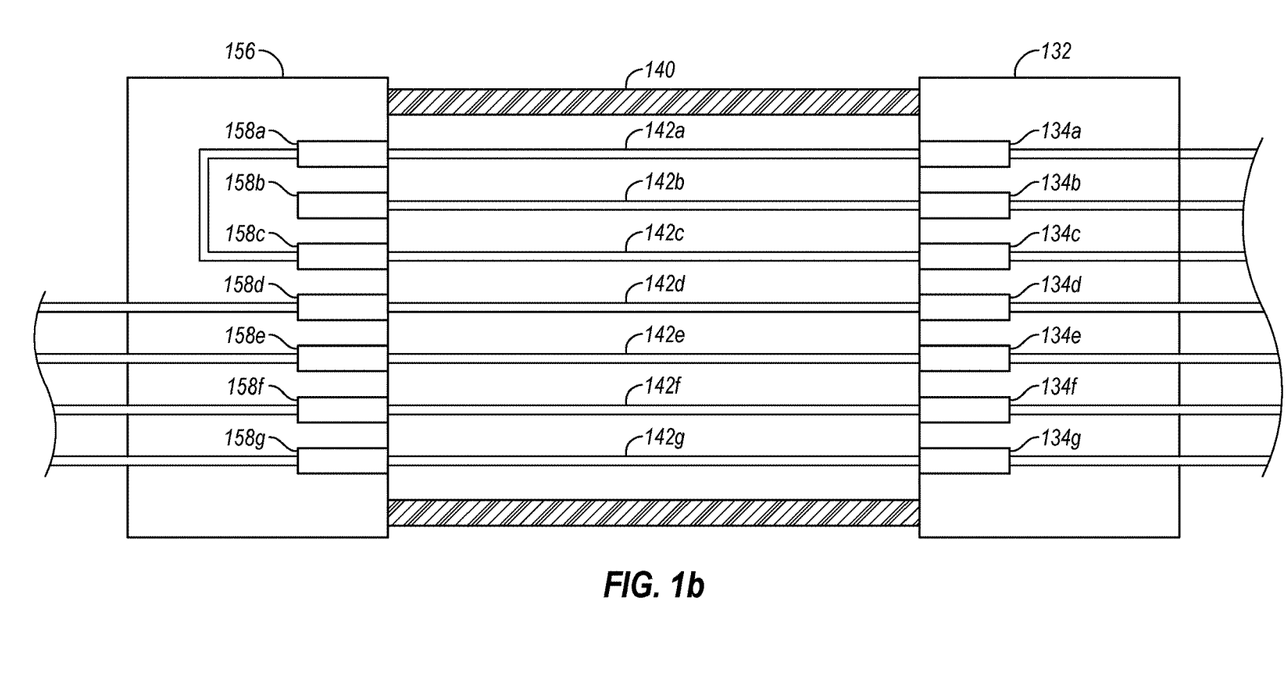
Figure 2:
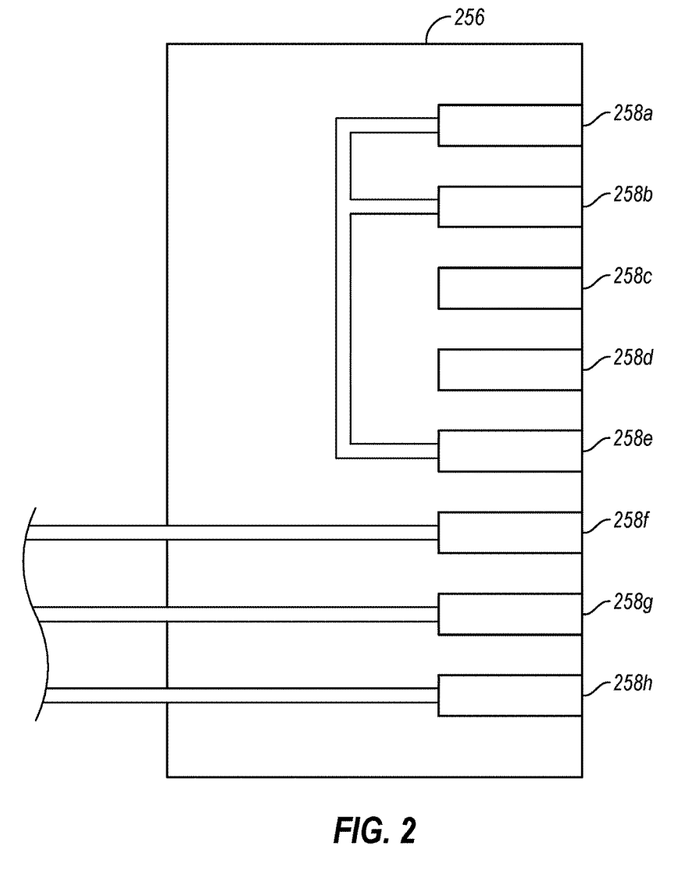
FIG. 2 illustrates an example electrical connector of a telephone receiver.

In some embodiments, the electrical connector 156 may include multiple electrical contacts, as illustrated in FIGS. 1b and 2. In some embodiments, a first subset of the contacts, which may include one or more contacts, may be directly electrically coupled to the speaker 152. The first subset of contacts may be configured receive electrical audio signals from the base unit 110 over the multi-line cable 140. The first subset of the contacts may provide the electrical audio signals to the speaker 152.

A second subset of the contacts, which may include one or more contacts, may be directly electrically coupled to the microphone 154. The second subset of contacts may be configured to receive electrical audio signals from the microphone 154 and provide the electrical audio signals to the base unit 110 over the multi-line cable 140.

A third subset of the contacts, which may include one or more contacts, may be used as identification contacts of the telephone receiver 150. In these and other embodiments, the identification contacts may be arranged to provide an identification of the telephone receiver 150.

For example, in some embodiments, an electrical signal may be provided to the base unit 110 through the identification contacts that include an identification of the telephone receiver 150. In some embodiments, the identification or identifier of the telephone receiver 150 may designate or otherwise be used to determine a type or version of the telephone receiver 150.

As another example, in some embodiments, the identification contacts may provide an identification of the telephone receiver 150 through an electrically passive manner. In these and other embodiments, the identification contacts may provide an identity of the telephone receiver 150 based on electrical characteristics of the identification contracts. In some embodiments, the electrical characteristics of the identification contacts may include the identification contacts being electrically grounded or electrically floating.

A contact may be electrically grounded when the contact is directly coupled to electrical ground through an electrical conductor. A contact may be electrically floating when the contact is not directly electrically coupled to a voltage or grounded. For example, a contact may be electrically floating when the contact is not electrically connected to anything in the telephone receiver 150 or is electrically disconnected from an electrical ground or voltage. In these and other embodiments, an electrically floating contact may be electrically isolated from other electrical or conductive components in the telephone receiver 150.

The electrical characteristics of the identification contacts may be used to determine an identifier of the telephone receiver 150. For example, when an identification contact is electrically grounded it may represent a first identifier. Whereas when an identification contact is electrically floating it may represent a second identifier. Thus, each individual identification contact may provide binary type identification information based on the electrical characteristics of each identification contact.

In some embodiments, the electrical characteristics of a combination of identification contacts may be used to determine an identifier of the telephone receiver 150. As each of the identification contacts may provide binary type identification information, a combination of the identification contacts may provide a binary number in a binary numerical system that may be used as an identifier of the telephone receiver 150. For example, when there are three identification contacts, the binary electrical characteristics of the identification contacts may be set in eight different combinations to represent eight different identifiers. In these and other embodiments, the electrically floating identification contacts may represent a binary one and the electrically grounded identification contacts may represent a binary zero, or vice-versa.

In some embodiments, the electrical connector 156 may be configured to be coupled to a first end 142 of the multi-line cable 140. In these and other embodiments, each of the contacts may be electrically coupled to one conductor or line in the multi-line cable 140. In some embodiments, the multi-line cable 140 may be removably coupled to the electrical connector 156. Alternatively or additionally, the multi-line cable 140 may be coupled to the telephone receiver 150 such that is not configured to be removably coupled.

The base unit 110 may be any analog, digital, or digital and analog device configured to enable voice calls, video calls, or other communication sessions, over an analog or digital interface and may include an audio processing system 120, a first connector 130, and a second connector 132. The communication sessions may be established over any combination of networks, including plain old telephone service (POTS) networks, data networks using Voice over Internet Protocol (VoIP) or other protocols, or cellular networks, among other types of communication networks. The base unit 110 may interface with the communication networks through the first connector 130. The base unit 110 may interface with the telephone receiver 150 through the second connector 132 by way of the multi-line cable 140. In these and other embodiments, a second end 144 of the multi-line cable 140 may be coupled to the second connector 132.

Audio signals from a communication network may be received by the base unit 110 at the first connector 130. For example, the audio signals may be digital or analog audio signals. The audio signals received from the communication network may be provided to the audio processing system 120. Alternatively or additionally, audio signals may be provided to a communication network by the first connector 130. In these and other embodiments, the audio processing system 120 may provide audio signals to the first connector 130 for transmission over a communication network.

The audio processing system 120 may be configured to apply particular audio settings to audio signals. The audio settings may cause the audio processing system 120 to filter, amplify, or otherwise adjust audio signals. In some embodiments, the audio settings may cause the audio processing system 120 to filter, amplify, or otherwise adjust the audio signals to compensate for the changes that may occur to the audio signals as the audio signals traverse a communication network. Alternatively or additionally, the audio settings may cause the audio processing system 120 to filter, amplify, or otherwise adjust the audio signals to compensate for hearing loss of a user of the telephone system 100. Alternatively or additionally, the audio settings may cause the audio processing system 120 to filter, amplify, or otherwise adjust the audio signals to compensate for a frequency response of the speaker 152 or the microphone 154. In these and other embodiments, the audio settings may be particular for each different type of speaker or microphone that may be coupled to the base unit 110.

As an example, audio signals may be received at the second connector 132 from the microphone 154 by way of the multi-line cable 140. The audio signals may be based on speech or other noise captured by the microphone 154. The audio signals may be adjusted by the audio processing system 120 based on a frequency response of the microphone 154. As another example, audio signals may be received at the first connector 130 from a communication network. The audio processing system 120 may process the audio signals based on a frequency response of the speaker 152. The processed audio signals may be provided to the speaker 152 by way of the multi-line cable 140.

In some embodiments, the base unit 110 may determine an identifier of the telephone receiver 150 that is coupled to the base unit 110 by way of the multi-line cable 140. In some embodiments, the base unit 110 may receive an electrical signal through the identification contacts of the electrical connector 156 that includes an identifier of the telephone receiver 150.

Alternatively or additionally, the base unit 110 may determine an identifier of the telephone receiver 150 based on the electrical characteristics of the identification contacts in the electrical connector 156. In these and other embodiments, the base unit 110 may determine the identifier of the telephone receiver 150 in an electrically passive manner. An electrically passive manner may indicate that no voltage or current is supplied to the telephone receiver 150 from the base unit 110 to determine the identifier of the telephone receiver 150. Additionally, no voltage or current is applied, used, or needed by the telephone receiver 150 when the base unit 110 determines the identifier of the telephone receiver 150. For example, the telephone receiver 150 does not place a voltage on or bring an identification contact to a voltage when the base unit 110 determines the identifier of the telephone receiver 150. As a result, in these and other embodiments, to provide an identification to the base unit 110, the telephone receiver 150 may not have an internal source of electricity or be supplied a source of electricity over the multi-line cable 140.

In these and other embodiments, the base unit 110 may determine an identifier of the telephone receiver 150 by determining the electrical characteristics of each of the identification contacts. After determining the identifier of the telephone receiver 150, the base unit 110 may be select audio settings that have been configured for the telephone receiver 150. For example, the audio settings may be configured based on a frequency response of one or more of the speaker 152 and the microphone 154 in the telephone receiver 150.

In these and other embodiments, the base unit 110 may include multiple different audio settings. Each of the audio settings may correspond with a different telephone receiver 150. Based on the identifier of a telephone receiver 150, the base unit 110 may select the corresponding audio setting and apply the corresponding audio settings to audio signals received from and sent to the telephone receiver 150 to process the audio signals in the digital or analog domain.

In some embodiments, the base unit 110 may determine an identifier of the telephone receiver 150 coupled to the base unit 110 at the start of every communication session. The start of a communication session may occur when a call is received by the base unit 110 or when a communication session is started when the telephone receiver 150 is activated. In some embodiments, the telephone receiver 150 may be activated by being placed in an off-hook condition. Alternatively or additionally, the base unit 110 may determine an identifier of the telephone receiver 150 periodically, at set intervals, or randomly. Alternatively or additionally, the base unit 110 may determine an identifier of the telephone receiver 150 in response to user input at the base unit 110, at reboot of the base unit 110, when the base unit 110 determines that the telephone receiver 150 has been disconnected and then reconnected, or as a result of some other event.

Figure 5:
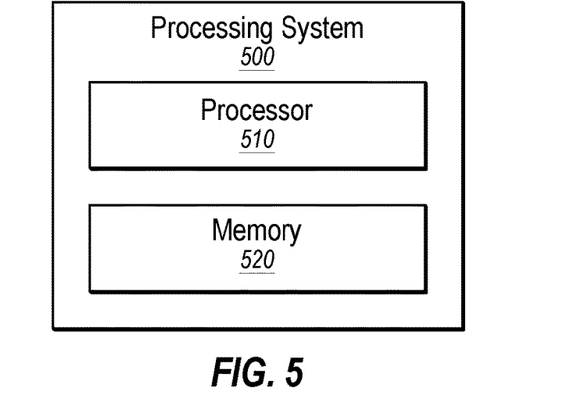
FIG. 5 illustrates an example processing system used to identify a telephone receiver.

Modifications, additions, or omissions may be made to the telephone system 100 without departing from the scope of the present disclosure. For example, in some embodiments, the telephone receiver 150 may not be configured as illustrated. In these and other embodiments, the telephone receiver 150 may be configured as a headset with a speaker for each ear, a microphone, and the multi-line cable 140 may be directly coupled to the telephone receiver 150. As another example, the base unit 110 may include multiple different connectors configured to be coupled to different communication networks. As another example, the base unit 110 may include additional components other than just the audio processing system 120. For example, the base unit 110 may include a processor and memory as illustrated in FIG. 5. In these and other embodiments, the processor and memory may be used to select and load audio profiles for the audio processing system 120 based on an identification of the telephone receiver 150.

FIG. 1b illustrates an example multi-wire cable coupled between electrical connectors of the telephone system of FIG. 1a. FIG. 1b may be arranged in accordance with at least one embodiment described in the present disclosure.

The electrical connector 156 may be part of the telephone receiver 150. The electrical connector 156 may include a first receiver contact 158a, a second receiver contact 158b, a third receiver contact 158c, a fourth receiver contact 158d, a fifth receiver contact 158e, a sixth receiver contact 158f, a seventh receiver contact 158g.

The multi-line cable 140 may include multiple conductive lines, including a first line 142a, a second line 142b, a third line 142c, a fourth line 142d, a fifth line 142e, a sixth line 142f, and a seventh line 142g.

The second connector 132 may be part of the base unit 110. The second connector 132 may include a first base contact 134a, a second base contact 134b, a third base contact 134c, a fourth base contact 134d, a fifth base contact 134e, a sixth base contact 134f, a seventh base contact 134g.

The first line 142a may directly electrically couple the first receiver contact 158a and the first base contact 134a. The second line 142b may directly electrically couple the second receiver contact 158b and the second base contact 134b. The third line 142c may directly electrically couple the third receiver contact 158c and the third base contact 134c. The fourth line 142d may directly electrically couple the fourth receiver contact 158d and the fourth base contact 134d. The fifth line 142e may directly electrically couple the fifth receiver contact 158e and the fifth base contact 134e. The sixth line 142f may directly electrically couple the sixth receiver contact 158f and the sixth base contact 134f. The seventh line 142g may directly electrically couple the seventh receiver contact 158g and the seventh base contact 134g.

Figure 1C:
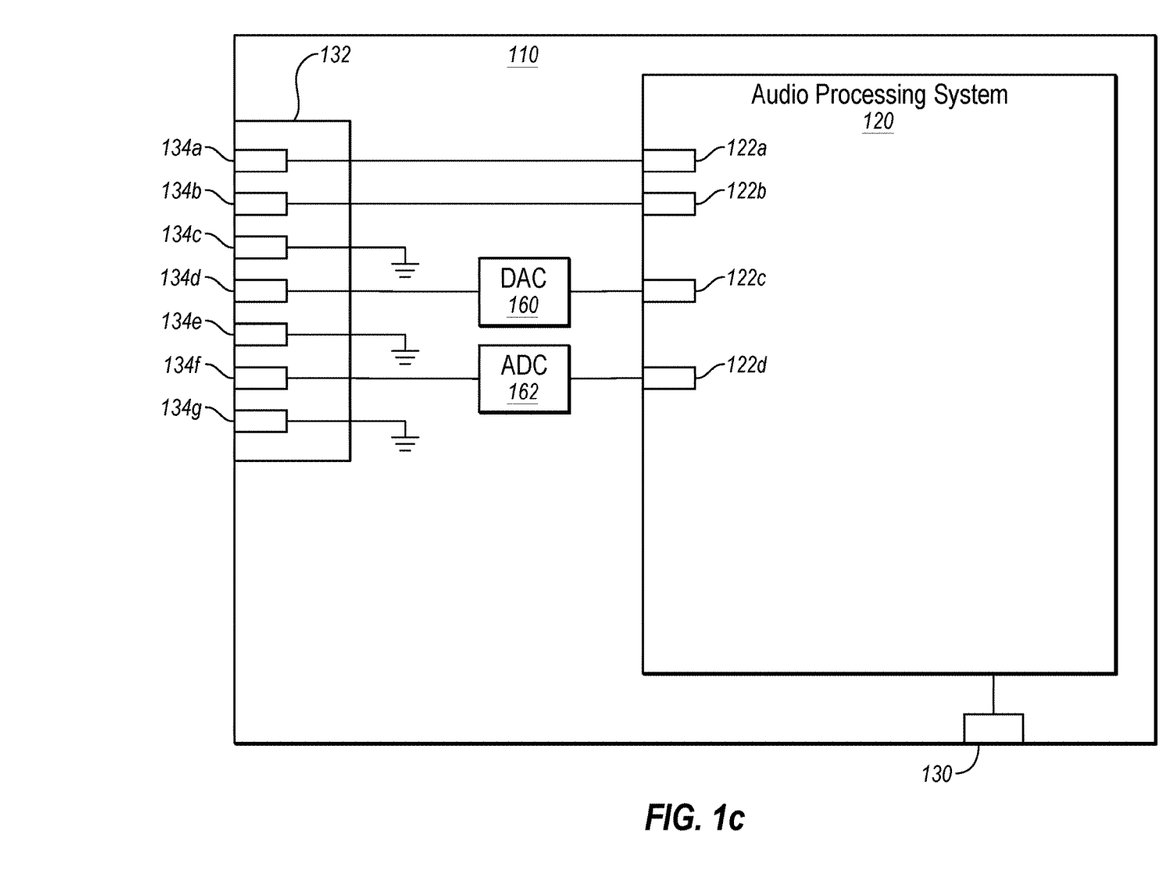

In some embodiments, the fourth receiver contact 158d may be configured to be directly electrically coupled to the speaker 152. The fourth receiver contact 158d may receive electrical audio signals sent over the fourth base contact 134d and the fourth line 142d and provide the electrical audio signals to the speaker 152. The fifth receiver contact 158e may be a ground contact that may be coupled to the speaker 152 and grounded at the base unit 110 as illustrated in FIG. 1c.

In some embodiments, the sixth receiver contact 158f may be configured to be directly electrically coupled to the microphone 154. The sixth receiver contact 158f may receive electrical audio signals from the microphone 154 and send the electrical audio signals over the sixth line 142f and the sixth base contact 134f to the base unit 110. The seventh receiver contact 158g may be a ground contact that may be coupled to the microphone 154 and grounded at the base unit 110 as illustrated in FIG. 1c.

In some embodiments, the first receiver contact 158a, the second receiver contact 158b and the third receiver contact 158*c* may be identification contacts in the electrical connector 156. In these and other embodiments, the first receiver contact 158*a* and the second receiver contact 158*b* may be used to provide an identifier of the telephone receiver 150. As a result, the telephone receiver 150 may provide an identifier of 0, 1, 2, or 3 in a binary numerical system based on the electrical characteristics of the first receiver contact 158*a* and the second receiver contact 158*b*. As illustrated, the first receiver contact 158*a* may be electrically grounded and the second receiver contact 158*b* may be electrically floating. As a result, assuming that the first receiver contact 158*a* is in a first numerical location, the second receiver contact 158*b* is in a second numerical location, a contact being electrically grounded represents a zero, and a contact that is electrically floating represents a one, the telephone receiver 150 would have an identifier of two.

As illustrated, the second receiver contact 158*b* is not electrically coupled to anything in the telephone receiver 150 and thus the second receiver contact 158*b* is electrically floating. The first receiver contact 158*a* is electrically grounded by being coupled to the third receiver contact 158*c* which is grounded through the base unit 110. In these and other embodiments, the third receiver contact 158*c* may be a ground contact that is not used to provide an identification of the telephone receiver 150, but rather to ground one or more of the identification contacts, such as the first receiver contact 158*a*.

The electrical characteristics of the first receiver contact 158*a* and the second receiver contact 158*b* may be changed to change the identifier of the telephone receiver 150. For example, if both the first receiver contact 158*a* and the second receiver contact 158*b* are electrically grounded by being directly electrically coupled to the third receiver contact 158*c*, the telephone receiver 150 would have an identifier of zero; if both the first receiver contact 158*a* and the second receiver contact 158*b* are electrically floating the telephone receiver 150 would have an identifier of three, and if the first receiver contact 158*a* is electrically floating and the second receiver contact 158*b* is electrically grounded by being directly electrically coupled to the third receiver contact 158*c*, the telephone receiver 150 would have an identifier of one.

Modifications, additions, or omissions may be made to the electrical connector 156 and the second connector 132 without departing from the scope of the present disclosure. For example, in some embodiments, the electrical connector 156 and the second connector 132 may include more or fewer connectors. For example, when the number of identifiers of the telephone receiver 150 is two, the first receiver contact 158*a* or the second receiver contact 158*b* may be removed. Alternatively or additionally, when the number of identifiers of the telephone receiver 150 is more than four, additional identification contacts may be added to the electrical connector 156 and the second connector 132. For example, with an additional identification contact, the number of identifiers of the telephone receiver 150 may be eight.

As another example, one of the fifth receiver contact 158*e* and the seventh receiver contact 158*g* may be removed and the speaker 152 and the microphone 154 may be both coupled to a single ground contact. As another example, the third receiver contact 158*c* may be removed and the first receiver contact 158*a* may be coupled to the ground contact used by the speaker 152 and/or the microphone 154.

FIG. 1*c* illustrates an example of a base unit of the telephone system of FIG. 1*a*. FIG. 1*c* may be arranged in accordance with at least one embodiment described in the present disclosure. As illustrated, the base unit 110 may further include a digital to analog converter (DAC) 160 and an analog to digital converter (ADC) 162 and the audio processing system 120 may include a first audio contact 122*a*, a second audio contact 122*b*, a third audio contact 122*c*, and a fourth audio contact 122*d*, referred to collectively as the audio contacts 122. In some embodiments, the audio contacts 122 may be input/output ports on a processor or some other chip. In these and other embodiments, the audio contacts 122 may be configured to perform one or more of the following: read a voltage level and output varying voltage levels that represent a digital signal.

The first base contact 134*a* may be directly electrically coupled to the first audio contact 122*a*. As a result, the first base contact 134*a* may be directly electrically coupled to the first receiver contact 158*a* by way of the first line 142*a* in the multi-line cable 140. The 134*b* may be directly electrically coupled to the second audio contact 122*b*. As a result, the second base contact 134*b* may be directly electrically coupled to the second receiver contact 158*b* by way of the second line 142*b* in the multi-line cable 140.

The audio processing system 120 may be configured to independently read a voltage level on the first audio contact 122*a* and the second audio contact 122*b*. Reading the voltage level on the first audio contact 122*a* and second audio contact 122*b* may allow the audio processing system 120 to determine the electrical characteristics of the first receiver contact 158*a* and the second receiver contact 158*b* by comparing the voltage levels to a voltage threshold. For example, when the voltage level of the first receiver contact 158*a* read by the audio processing system 120 is below the voltage threshold, the first receiver contact 158*a* may be electrically grounded. When the voltage level of the first receiver contact 158*a* is above the voltage threshold, the audio processing system 120 may determine that the first receiver contact 158*a* is electrically floating. Using the electrical characteristic of the first receiver contact 158*a* and the second receiver contact 158*b*, the audio processing system 120 may determine an identifier of the telephone receiver 150. In some embodiments, the voltage threshold may depend on threshold levels as set by the audio processing system 120, the noise of the telephone system 100, among other factors.

The fourth base contact 134*d* may be coupled to the DAC 160 and the DAC 160 may be coupled to the third audio contact 122*c*. The audio processing system 120 may be configured to output digital audio signals on the fourth base contact 134*d*. The DAC 160 may receive the digital audio signals and convert the digital audio signals to analog audio signals that may be provided to the fourth base contact 134*d*. The fourth base contact 134*d* may pass the analog audio signals along such that analog audio signals arrive at the speaker 152.

The sixth base contact 134*f* may be coupled to the ADC 162 and the ADC 162 may be coupled to the fourth audio contact 122*d*. The ADC 162 may receive analog audio signals from the sixth base contact 134*f* that originate at the microphone 154. The ADC 162 may convert the analog audio signals to digital audio signals and pass the digital audio signals to the fourth audio contact 122*d*.

The third base contact 134*c* may be electrically grounded. In some embodiments, the third base contact 134*c* may be coupled to digital ground in the base unit 110. The fifth base contact 134*e* may be electrically grounded. In some embodiments, the fifth base contact 134*e* may be coupled to analog ground in the base unit 110. The seventh base contact 134*g* may be electrically grounded. In some embodiments, the seventh base contact 134*g* may be coupled to analog ground in the base unit 110. The fifth base contact 134e and the seventh base contact 134g may be coupled to analog ground as analog signals may be used by the speaker 152 and the microphone 154. The fifth base contact 134e may be coupled to digital ground because the audio processing system 120 may read the first audio contact 122a and the second audio contact 122b based on voltages used by the digital portion of the base unit 110.

Modifications, additions, or omissions may be made to the second connector 132 and the audio processing system 120 without departing from the scope of the present disclosure. For example, as explained above with respect to FIG. 1b, the electrical connector 156 may include additional identification contacts. In these and other embodiments, the audio processing system 120 may include an audio contact for each of the identification contacts. The other alternatives discussed with respect to FIG. 1b may also apply to FIG. 1c.

FIG. 2 illustrates an example electrical connector 256 of a telephone receiver. The electrical connector 256 may be arranged in accordance with at least one embodiment described in the present disclosure. The electrical connector 256 may be an example of the electrical connector 156 of FIGS. 1a-1c with a different configuration of contacts.

The electrical connector 256 may include a first receiver contact 258a, a second receiver contact 258b, a third receiver contact 258c, a fourth receiver contact 258d, a fifth receiver contact 258e, a sixth receiver contact 258f, a seventh receiver contact 258g, and an a eighth receiver contact 258h, referred to collectively as the contacts 258.

The first receiver contact 258a, the second receiver contact 258b, the third receiver contact 258c, and the fourth receiver contact 258d may be identification contacts. As illustrated, the first receiver contact 258a and the second receiver contact 258b may be directly electrically coupled to the fifth receiver contact 258e, which may be electrically grounded. As a result, the first receiver contact 258a and the second receiver contact 258b may be electrically grounded. The third receiver contact 258c and the fourth receiver contact 258d may be electrically floating as the third receiver contact 258c and the fourth receiver contact 258d may not be electrically coupled to anything in the electrical connector 256.

The sixth receiver contact 258f may be directly electrically coupled with a speaker coupled to the electrical connector 256. The seventh receiver contact 258g may be directly electrically coupled with a microphone coupled to the electrical connector 256. The eighth receiver contact 258h may be electrically grounded may be coupled to both the speaker and the microphone coupled respectively to the sixth receiver contact 258f and the seventh receiver contact 258g.

Modifications, additions, or omissions may be made to the electrical connector 256 without departing from the scope of the present disclosure. For example, in some embodiments, the electrical connector 256 may include more or fewer contacts 258 than the eight illustrated. Alternatively or additionally, the contacts 258 may be arranged or coupled in a different configuration than explained.

Figure 3A:
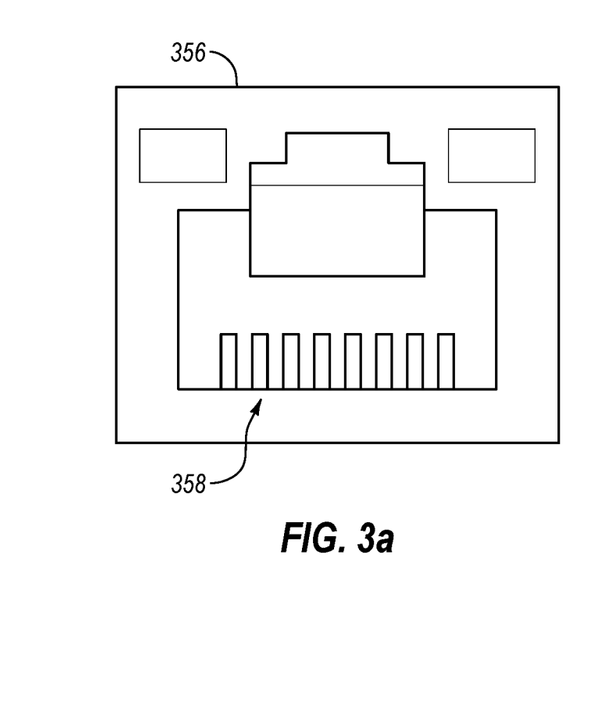
FIG. 3a illustrates an example electrical connector of a telephone receiver.
Figure 3B:
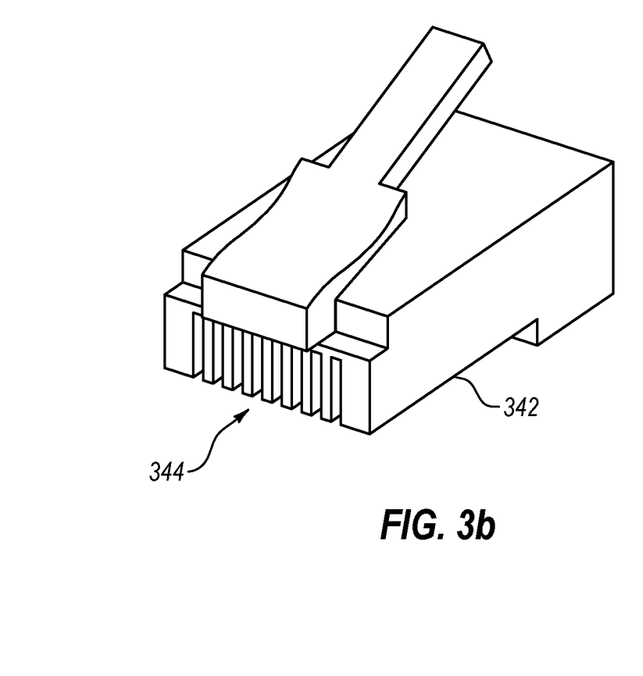
FIG. 3b illustrates an example electrical connector of a multi-line cable.

FIG. 3a illustrates an example electrical connector 356 of a telephone receiver. FIG. 3b illustrates an example electrical connector 342 of a multi-line cable 340. The electrical connector 356 and the multi-line cable 340 may be arranged in accordance with at least one embodiment described in the present disclosure.

In FIG. 3a, the electrical connector 356 may be an example of the electrical connector 156 or the electrical connector 256 of FIGS. 1a-1c and 2. The electrical connector 356 may include electrical contacts 358. In FIG. 3b, the electrical connector 342 may be coupled to the multi-line cable 340. The multi-line cable 340 may be an example of the multi-line cable 140 of FIGS. 1a-1c.

As an example, FIGS. 3a and 3b may illustrate how a multi-line cable may be removably coupled to an electrical connector. With reference to both FIGS. 3a and 3b, the electrical connector 342 may be configured to be removably received by the electrical connector 356. When the electrical connector 342 is received by the electrical connector 356, electrical contacts on the electrical connector 342 that are each electrically connected to one conductor in the multi-wire cable 340 may directly contact the electrical contacts 358 to form an electrical connection between the electrical connector 356 and the electrical connector 342. Modifications, additions, or omissions may be made to the electrical connector 356 and the multi-line cable 340 without departing from the scope of the present disclosure.

Figure 4:
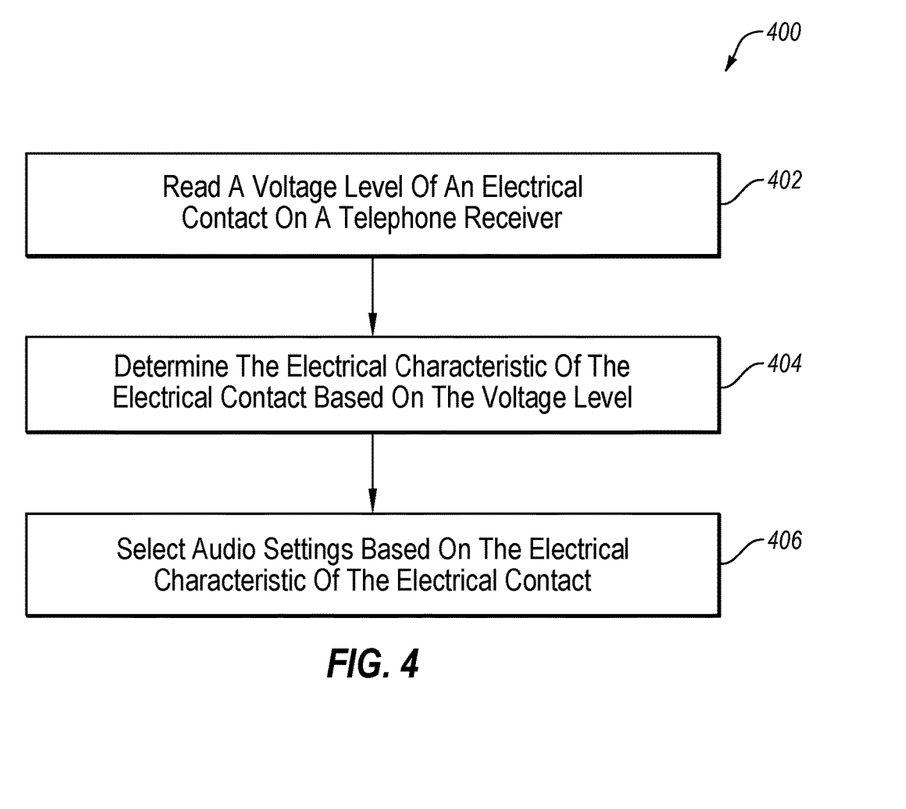
FIG. 4 is a flowchart of an example method to identify a telephone receiver.

FIG. 4 is a flowchart of an example method 400 to identify a telephone receiver. The method 400 may be arranged in accordance with at least one embodiment described in the present disclosure. The method 400 may be performed, in whole or in part, in some embodiments by a telephone system, such as the telephone system 100, and/or a portion of the telephone system, such as the base unit 110 and/or a processing system 500 of FIGS. 1a, 1b, and 5, respectively. In these and other embodiments, some or all of the steps of the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a voltage level of an electrical contact on a telephone receiver may be read. In some embodiments, the voltage level may be read by a base unit electrically coupled to the telephone receiver.

In block 404, the electrical characteristic of the electrical contact may be determined based on the voltage level. In some embodiments, the electrical characteristics of the electrical contact may be determined by comparing the voltage to a voltage threshold.

In block 406, audio settings may be selected based on the electrical characteristic of the electrical contact. In some embodiments, the electrical characteristic of the electrical contact may indicate an identifier of the telephone receiver. Based on the identifier of the telephone receiver, the audio settings that correspond to the telephone receiver may be selected. In some embodiments, the audio settings may be selected by a base unit from among multiple audio settings stored in a memory of the base unit. In these and other embodiments, the audio settings may be configured to compensate for a frequency response of components, such as a microphone or speaker of the telephone receiver.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include applying the audio settings to audio presented or generated by the telephone receiver. The audio settings may be applied by a base unit that is electrically coupled to the telephone receiver.

FIG. 5 illustrates an example processing system 500 used to identify a telephone receiver. The processing system 500 may be arranged in accordance with at least one embodiment described in the present disclosure.

The processing system 500 may include a processor 510 and a memory 520. In some embodiments, the processing system 500 may be part of the base unit 110 of FIGS. 1a and 1c.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include a multi-core processor or any number of processors distributed across any number of networks or physical locations that are configured to perform individually or collectively any number of operations described herein. In some embodiments, the processor 510 may interpret and/or execute program instructions and/or process data stored in the memory 520.

The memory 520 may include one or more types of computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of *In re Nuijten*, 500 F.3d 1346 (Fed. Cir. 2007). In some embodiments, computer-executable instructions may include, for example, instructions and data configured to cause the processor 510 to perform or cause performance of a certain operation or group of operations, such as one or more blocks of the method 400. In these and other embodiments, the memory 520 may include the audio settings.

Modifications, additions, or omissions may be made to the processing system 500 without departing from the scope of the present disclosure. For example, in some embodiments, the processing system 500 may include additional elements.

Figure 6:
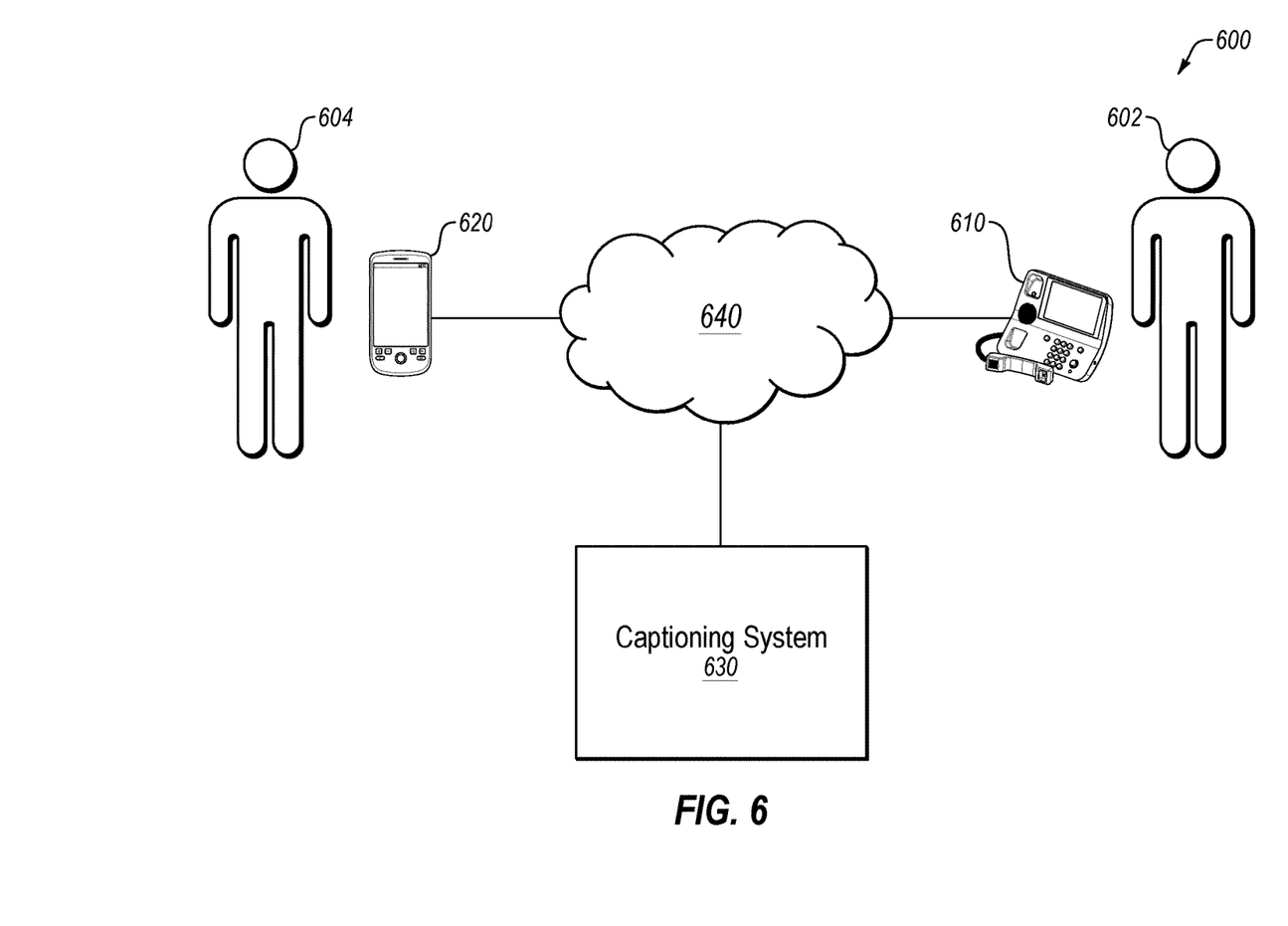
FIG. 6 illustrates an example communication system that may include a telephone system that is configured to identify telephone receivers used in the telephone system.

FIG. 6 illustrates an example communication system 600 that may include a communication device configured to adjust audio amplification of output audio. The communication system 600 may be arranged in accordance with at least one embodiment described in the present disclosure.

The communication system 600 may include a first device 610, a second device 620, and a system 630. The first device 610 and/or the second device 620 may be examples of the telephone system 100 of FIG. 1a. Thus, FIG. 6 illustrates an environment or system that may use the telephone system 100 of FIG. 1a.

The first device 610 and the system 630 may be communicatively coupled by a network 640. Alternately or additionally, the first device 610 and the second device 620 may be communicatively coupled by the network 640. In some embodiments, the network 640 may be any network or configuration of networks configured to send and receive communications between systems and devices. In some embodiments, the network 640 may include a conventional type network, a wired or wireless network, and may have numerous different configurations. In some embodiments, the network 640 may also be coupled to or may include portions of a telecommunications network, including telephone lines, for sending data in a variety of different communication protocols, such as a plain old telephone system (POTS).

In some embodiments, the communication system 600 illustrated may be configured to facilitate an assisted call between a hearing-impaired user 602 and a second user 604. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

Alternatively or additionally, the communication system 600 illustrated may be configured to facilitate a call between a person with medical expertise and/or experience and the hearing-impaired user 602. As used in the present disclosure, a "person with medical expertise and/or experience" may be a nurse, doctor, or some other trained medical professional.

In some embodiments, a communication session, such as an audio or a video communication session, may be established between the first device 610 and the second device 620. In one example embodiment, the communication session may be a captioning communication session.

In some embodiments, the system 630 may be an assistive service, which is intended to permit a hearing-impaired person to utilize a communication network and assist their understanding of a conversation by providing text captions to supplement voice conversation occurring during communication sessions with other devices, such as the second device 620. Alternatively or additionally, the system 630 may be an assistive service to couple a person with medical expertise and/or experience with a person requesting medical assistance.

During a communication session, the system 630 and the first device 610 may be communicatively coupled using networking protocols. In some embodiments, during the communication session between the first device 610 and the second device 620, the first device 610 may provide the audio signal from the second device 620 to the system 630.

In some embodiments, at the system 630, a call assistant may listen to the audio signal of the second user 604 and "revoice" the words of the second user 604 to a speech recognition computer program tuned to the voice of the call assistant. In these and other embodiments, the call assistant may be an operator who serves as a human intermediary between the hearing-impaired user 602 and the second user 604. In some embodiments, text captions may be generated by the speech recognition computer as a transcription of the audio signal of the second user 604. The text captions may be provided to the first device 610 being used by the hearing-impaired user 602 over the network 640. The first device 610 or another device may display the text captions while the hearing-impaired user 602 carries on a normal conversation with the second user 604. The text captions may allow the hearing-impaired user 602 to supplement the voice signal received from the second device 620 and confirm his or her understanding of the words spoken by the second user 604.

Modifications, additions, or omissions may be made to the communication system 600 without departing from the scope of the present disclosure. For example, in some embodiments, the second user 604 may be hearing impaired. In these and other embodiments, the system 630 may provide text captions to the second device 620 based on audio data transmitted by the first device 610. Alternately or additionally, the system 630 may include additional functionality. For example, the system 630 may edit the text captions or make other alterations to the text captions after presentation of the text captions on the first device 610.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 520 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A telephone system comprising:
   a telephone receiver including:
      a first electrical contact; and
      a second electrical contact configured to be electrically grounded, the first electrical contact either coupled to the second electrical contact or electrically floating; and
   a base unit configured to be coupled to the telephone receiver over a wired connection, the base unit configured to:
      electrically ground the second electrical contact by way of the wired connection, and
      determine an identification of the telephone receiver based on whether the first electrical contact is electrically grounded or electrically floating.

2. The telephone system of claim 1, wherein the base unit is further configured to:
   select audio settings based on the determined identification of the telephone receiver; and
   apply the audio settings to audio that is provided to the telephone receiver for presentation by the telephone receiver.

3. The telephone system of claim 2, wherein the audio settings are based on a frequency response of the telephone receiver.

4. The telephone system of claim 1, wherein the telephone receiver further includes:
   a microphone;
   a speaker;
   a third electrical contact electrically coupled to the speaker and configured to receive fust electrical signals from the base unit to provide to and drive the speaker; and
   a fourth electrical contact electrically coupled to the microphone and configured to receive second electrical signals from the microphone that are provided to the base unit.

5. The telephone system of claim 4, wherein the second electrical contact is directly electrically coupled to one or more of: the microphone and the speaker.

6. The telephone system of claim 4, wherein the second electrical contact is electrically isolated from the microphone and the speaker.

7. The telephone system of claim 1, wherein the base unit is configured to determine the identification of the telephone receiver by:
   reading a voltage level of an input port electrically coupled to the first electrical contact;
   comparing the voltage level to a threshold level; and
   determining the first electrical contact is electrically grounded when the voltage level is below the threshold level.

8. The telephone system of claim 1, wherein the telephone receiver further includes a plurality of electrical contacts that include the first electrical contact, each of the plurality of electrical contacts are either coupled to the second electrical contact or electrically floating,
   wherein the base unit is further configured to determine the identification of the telephone receiver based on which of the plurality of electrical contacts are electrically grounded and which of the plurality of electrical contacts are electrically floating.

9. The telephone system of claim 1, wherein the wired connection is a multi-line cable with a first end and a second end, wherein the telephone receiver is configured to be coupled to the first end and the base unit is configured to be coupled to the second end.

10. A telephone receiver comprising:
    a speaker;
    a microphone; and
    an electrical connector configured to be electrically coupled to a multi-line cable, the electrical connector including:
       a first electrical contact electrically coupled to the speaker and configured to receive first electrical signals to provide to and drive the speaker;
       a second electrical contact electrically coupled to the microphone and configured to receive second electrical signals from the microphone; and
       a third electrical contact that is electrically floating such that the third electrical contact is not electrically grounded, wherein the third electrical contact is configured to be used to determine an identification of the telephone receiver.

11. The telephone receiver of claim 10, wherein the electrical connector further includes:
    a fourth electrical contact that is a ground contact of the speaker or the microphone; and
    a fifth electrical contact that is directly electrically coupled to the fourth electrical contact.

12. The telephone receiver of claim 10, wherein the electrical connector further includes:
    a fourth electrical contact that is unassociated with the speaker and the microphone; and
    a fifth electrical contact that is directly electrically coupled to the fourth electrical contact.

13. The telephone receiver of claim 10, wherein the electrical connector is configured to removably couple to the multi-line cable.

14. The telephone receiver of claim 10, wherein the telephone receiver is a telephone handset.

15. A telephone receiver comprising:
    a speaker;
    a microphone; and
    an electrical connector configured to be electrically coupled to a multi-line cable, the electrical connector including a plurality of electrical contacts, the plurality of electrical contacts including:
       a first electrical contact electrically coupled to the speaker and configured to receive first electrical signals to provide to and drive the speaker;
       a second electrical contact electrically coupled to the microphone and configured to receive second electrical signals from the microphone;
       a third electrical contact that is unassociated with the speaker and the microphone and configured to be used to determine an identification of the telephone receiver; and
       a fourth electrical contact that is directly electrically coupled to the third electrical contact and configured to be used to determine the identification of the telephone receiver.

16. The telephone receiver of claim 15, wherein the fourth electrical contact is configured to be grounded.

17. The telephone receiver of claim 15, wherein the plurality of electrical contacts further include a fifth electrical contact that is electrically floating.

18. The telephone receiver of claim 17, wherein the plurality of electrical contacts further include a sixth electrical contact that is electrically floating.

19. The telephone receiver of claim 15, wherein the electrical connector is configured to removably couple to the multi-line cable.

20. The telephone receiver of claim 15, wherein the telephone receiver is a telephone handset.

\* \* \* \* \*